United States Patent
Handa et al.

(10) Patent No.: US 8,332,112 B2
(45) Date of Patent: Dec. 11, 2012

(54) CONTROL DEVICE FOR CONTROLLING DRIVE FORCE THAT OPERATES ON VEHICLE

(75) Inventors: Toshiyuki Handa, East Liberty, OH (US); James W. Post, II, Raymond, OH (US)

(73) Assignees: Nissin Kogyo Co., Ltd., Ueda-shi (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/075,937

(22) Filed: Mar. 30, 2011

(65) Prior Publication Data

US 2012/0253630 A1    Oct. 4, 2012

(51) Int. Cl.
*B60K 17/34* (2006.01)

(52) U.S. Cl. ............................... 701/69; 701/89

(58) Field of Classification Search .............. 701/69, 701/89
See application file for complete search history.

(56) References Cited

U.S. PATENT DOCUMENTS

| | | | | |
|---|---|---|---|---|
| 4,966,249 A * | 10/1990 | Imaseki | ............... | 180/233 |
| 5,032,995 A * | 7/1991 | Matsuda et al. | ............... | 701/29.2 |
| 5,041,978 A * | 8/1991 | Nakayama et al. | ............... | 701/84 |
| 5,168,955 A * | 12/1992 | Naito | ............... | 180/197 |
| 5,183,131 A * | 2/1993 | Naito | ............... | 180/233 |
| 5,251,719 A * | 10/1993 | Eto et al. | ............... | 180/197 |
| 5,448,478 A * | 9/1995 | Eto | ............... | 701/69 |
| 5,497,333 A * | 3/1996 | Sasaki | ............... | 701/72 |
| 5,631,829 A * | 5/1997 | Takasaki et al. | ............... | 701/69 |
| 5,742,917 A * | 4/1998 | Matsuno | ............... | 701/69 |
| 5,894,904 A * | 4/1999 | Yakou et al. | ............... | 180/247 |
| 6,009,968 A * | 1/2000 | Kouno | ............... | 180/248 |
| 6,115,663 A * | 9/2000 | Yasuda | ............... | 701/89 |
| 6,453,228 B1 * | 9/2002 | Shimada | ............... | 701/89 |
| 6,698,541 B2 * | 3/2004 | Sakakiyama | ............... | 180/233 |
| 6,729,426 B2 * | 5/2004 | Suzuki | ............... | 180/197 |
| 6,843,338 B2 * | 1/2005 | Ohtsu | ............... | 180/233 |
| 6,909,959 B2 * | 6/2005 | Hallowell | ............... | 701/88 |
| 7,127,342 B2 * | 10/2006 | Nagura et al. | ............... | 701/69 |
| 7,263,424 B2 * | 8/2007 | Motoyama | ............... | 701/69 |
| 7,624,832 B2 * | 12/2009 | Yoneda et al. | ............... | 180/233 |
| 2006/0212173 A1 * | 9/2006 | Post, II | ............... | 700/275 |
| 2008/0071451 A1 * | 3/2008 | Yamaguchi et al. | ............... | 701/69 |
| 2008/0183353 A1 * | 7/2008 | Post et al. | ............... | 701/42 |

FOREIGN PATENT DOCUMENTS

JP    2006-256605    9/2006

* cited by examiner

*Primary Examiner* — Michael J. Zanelli
(74) *Attorney, Agent, or Firm* — Rankin, Hill & Clark LLP

(57) ABSTRACT

A control device for controlling a front wheel drive force and a rear wheel drive force of a vehicle includes a first controller for controlling a drive force of main drive wheels and a drive force of auxiliary drive wheels, wherein the drive force of the main drive wheel is one of the front-wheel drive force and the rear-wheel drive force, and the drive force of the auxiliary drive wheel is another of the front-wheel drive force and the rear-wheel drive force, and a second controller for sending to the first controller an auxiliary-drive-wheels-limiting drive force for limiting the drive force of the auxiliary drive wheels. The second controller has a preparatory unit for preparing reference drive force, a first limiting unit for limiting a reduction in the auxiliary-drive-wheels-limiting drive force, and a second limiting unit for limiting an increase in the auxiliary-drive-wheels-limiting drive force.

16 Claims, 7 Drawing Sheets

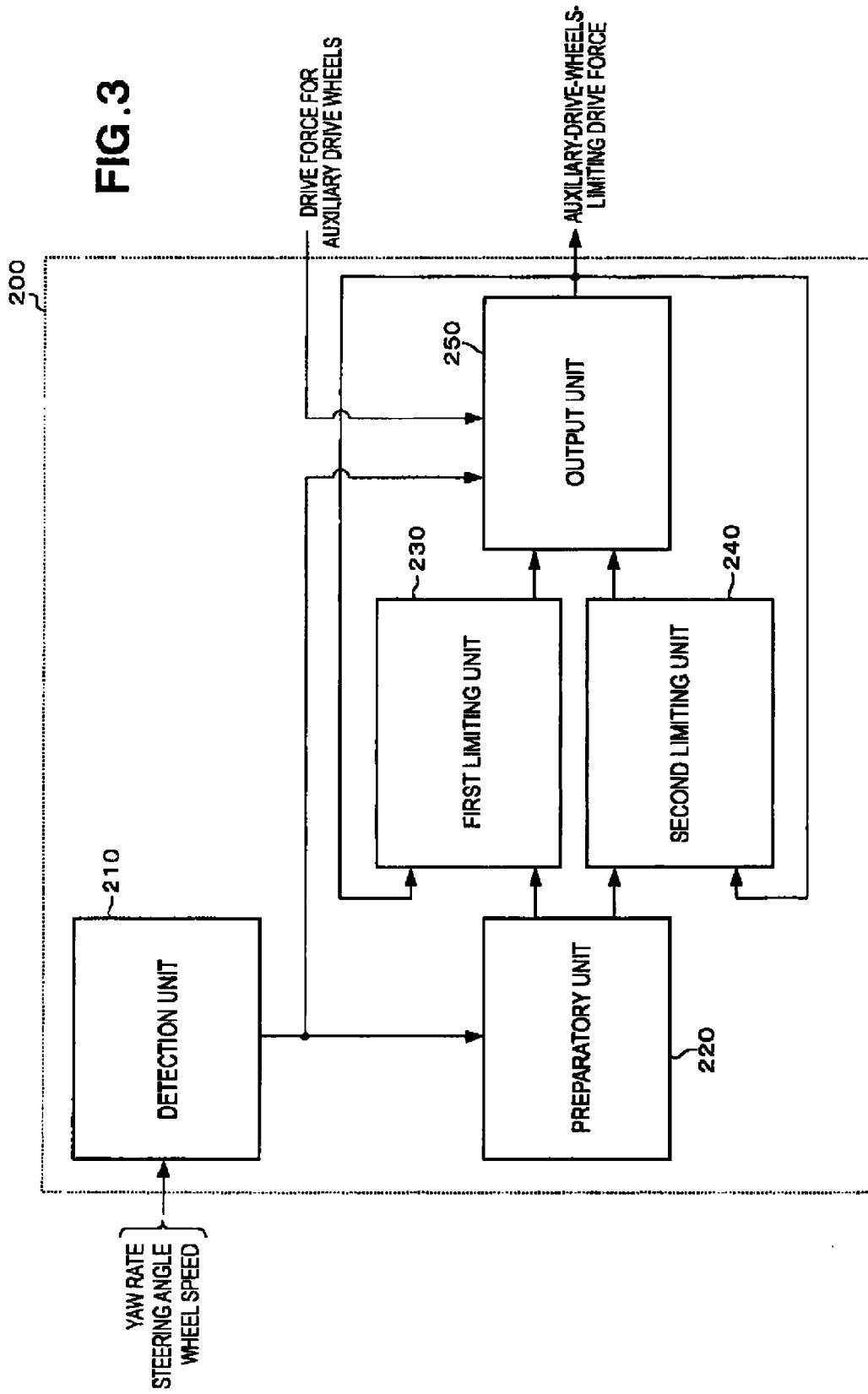

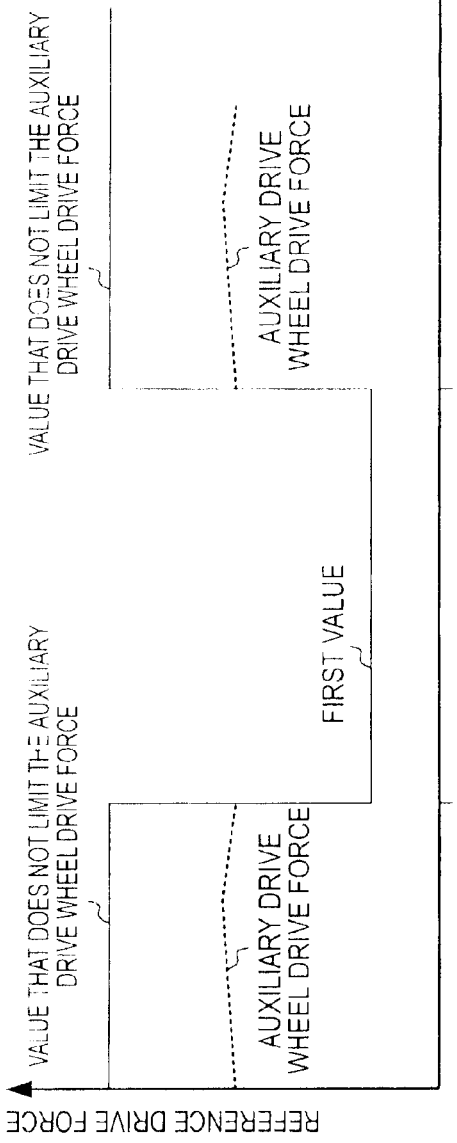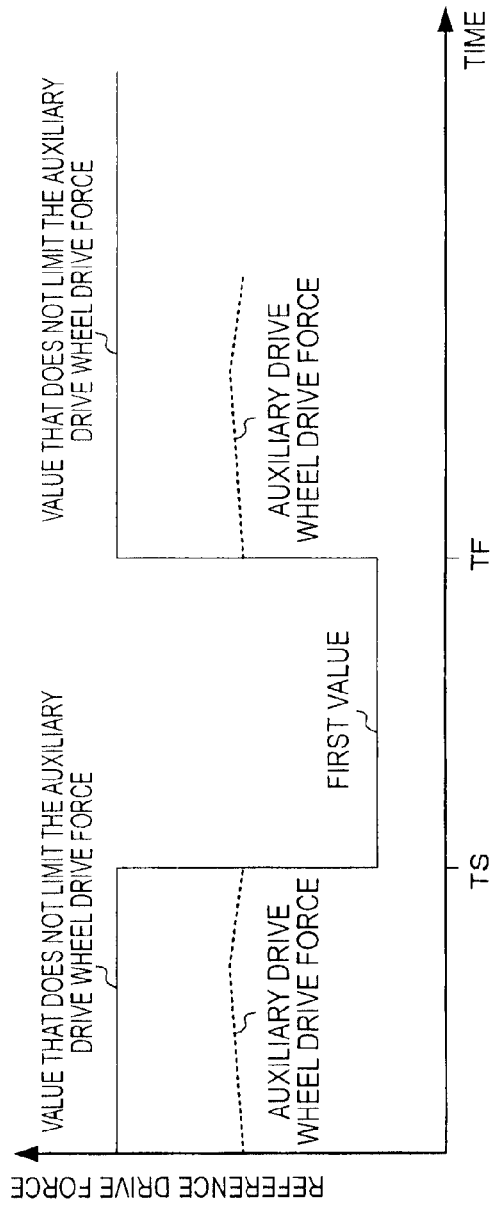

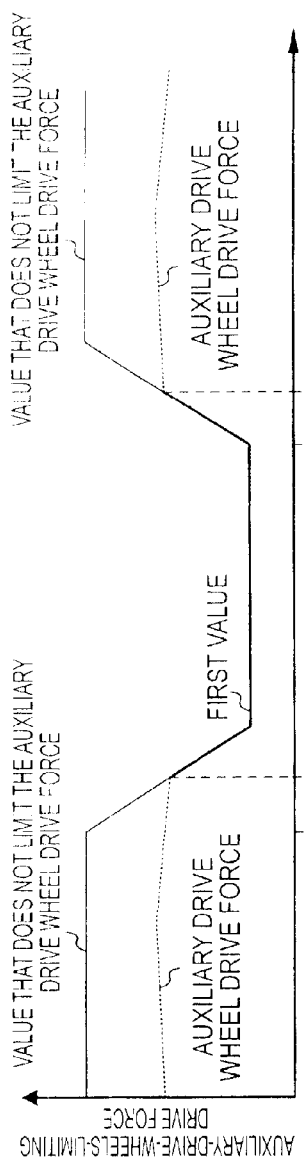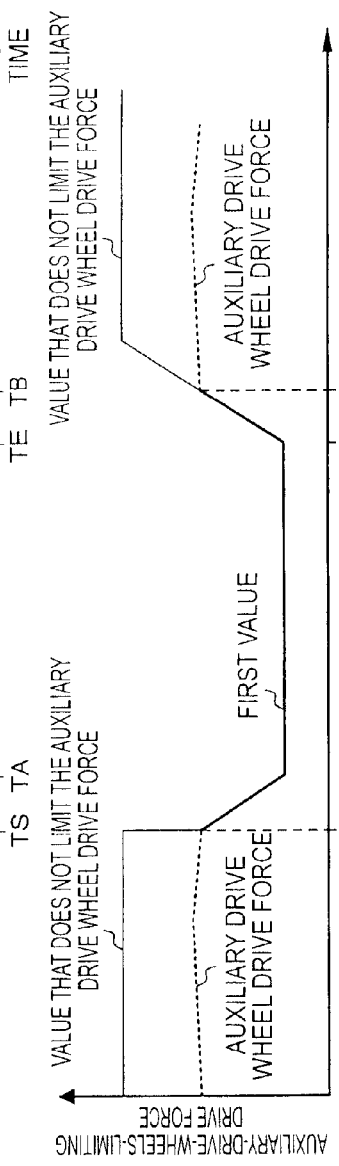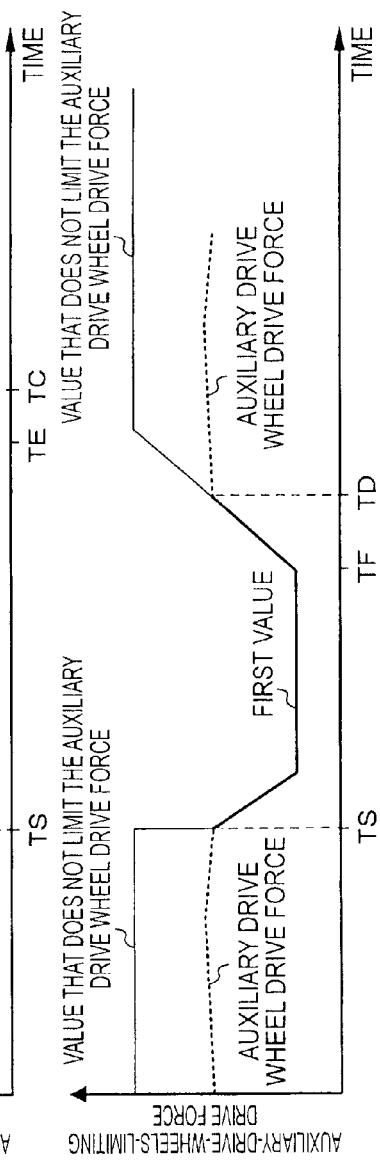

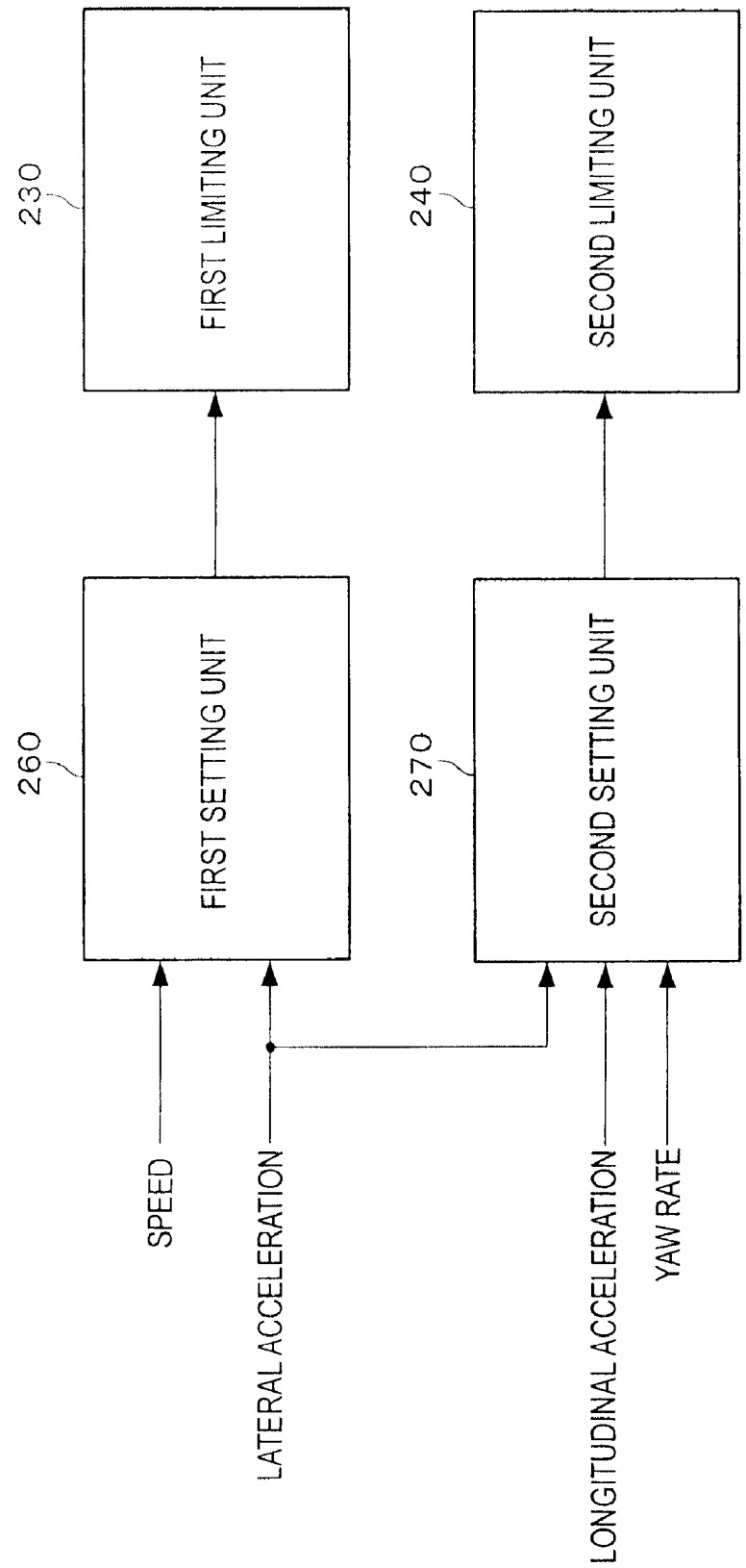

CONTROL DEVICE FOR CONTROLLING
DRIVE FORCE THAT OPERATES ON
VEHICLE

FIELD OF THE INVENTION

The present invention relates to a control device (drive force control device) for controlling front wheel drive force and rear wheel drive force of a vehicle.

BACKGROUND OF THE INVENTION

Vehicles, e.g., automobiles, generally have four wheels; i.e., two front wheels and two rear wheels, and can have an electronic control device for driving the wheels.

Japanese Laid-open Patent Application (JP-A) No. 2006-256605 discloses a four-wheel-drive electronic control unit (4WD-ECU) as such an electronic control device. The 4WD-ECU disclosed in JP 2006-256605 A together with a vehicle stability assist (VSA)-ECU controls the drive force that operates on the vehicle, and specifically determines, e.g., the torque as units.

In this manner, a 4WD-ECU operates in coordination with the VSA-ECU and controls the drive force. Specifically, the VSA-ECU can request the 4WD-ECU to limit the drive force in the case that, e.g., the traveling state of the vehicle is unstable. The 4WD-ECU can reduce the drive force and improve vehicle stability in response to a request from the VSA-ECU.

A VSA-ECU or other vehicle behavior control means can generally be provided with at least one function from among a function for suppressing spinning of wheels (traction control system), a function for suppressing locking of wheels (antilock brake system), and a function for suppressing side-slipping of a vehicle.

SUMMARY OF THE INVENTION

An object of the present invention is to provide a control device that can improve the stability of a vehicle.

Other objects of the present invention will be apparent to those skilled in the art in the description of a plurality of modes and preferred embodiments below with reference to the accompanying sheets of drawings.

A number of aspects from among the plurality of aspects pursuant to the present invention will be described below in order to facilitate understanding of the general overview of the present invention.

A first aspect of the present invention relates to a control device for controlling a front wheel drive force and a rear wheel drive force of a vehicle, the control device comprising: first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; and second control means for sending to the first control means an auxiliary-drive-wheel-limiting drive force for limiting the drive force of the auxiliary drive wheel, wherein the second control means has: a preparatory unit for preparing a reference drive force; a first limiting unit for limiting a reduction in the auxiliary-drive-wheel-limiting drive force; and a second limiting unit for limiting an increase in the auxiliary-drive-wheel-limiting drive force, wherein the second control means sends to the first control means the reference drive force as the auxiliary-drive-wheel-limiting drive force via the first limiting unit and the second limiting unit.

The inventors found that vehicle stability can be improved by reducing variation in the auxiliary-drive-wheels-limiting drive force. In the case that the auxiliary-drive-wheels-limiting drive force decreases in the control device, the reduction can be limited by the first limiting unit. In the case that the auxiliary-drive-wheels-limiting drive force increases, the increase can be limited by the second limiting unit. Therefore, in the case that variation in the auxiliary-drive-wheels-limiting drive force is considerable, the second control means can request a reference drive force via the first limiting unit and the second limiting unit, instead of requesting a prepared reference drive force of itself. Variation in the auxiliary-drive-wheels-limiting drive force requested by the second control means can be set to a low level.

The first control means according to the first aspect may increase the drive force of the main drive wheel by causing the drive force of the auxiliary drive wheel to match the auxiliary-drive-wheel-limiting drive force from the second control means.

The drive force of the auxiliary drive wheels is made to match the auxiliary-drive-wheels-limiting drive force, and as a consequence, the drive force of the auxiliary drive wheels can be reduced and the drive force of the main drive wheels can be increased. Specifically, the first control means can change or modify the ratio of the drive force of the main drive wheels to the drive force of the auxiliary drive wheels in response to a request from the second control means. In the case that the traveling state of the vehicle is, e.g., oversteer and is therefore unstable, the ratio of the drive force of the main drive wheels to the drive force of the auxiliary drive wheels can be changed to suppress or eliminate oversteer.

In one preferred form of the invention, in the case that an amount by which the auxiliary-drive-wheel-limiting drive force decreases is greater than a lower limit value, the first limiting unit causes the amount of decrease to match the lower limit value, where a smaller lower limit value corresponds to a higher vehicle speed.

The lower limit value is set to be lower in correspondence to a higher vehicle speed. Therefore, in the case that vehicle is traveling at high speed, the amount by which the auxiliary-drive-wheels-limiting drive force decreases, i.e., the change in the auxiliary-drive-wheels-limiting drive force, can be set low. The stability of a vehicle can thereby be improved.

In another preferred form of the invention, in the case that an amount by which the auxiliary-drive-wheel-limiting drive force decreases is greater than a lower limit value, the first limiting unit causes the amount of decrease to match the lower limit value, where a smaller lower limit value corresponds to a higher lateral acceleration of the vehicle.

The lower limit value is set to be lower in correspondence to the lateral acceleration of the vehicle. Therefore, when the lateral acceleration of a vehicle is high, the amount by which the auxiliary-drive-wheels-limiting drive force decreases, i.e., the change in the auxiliary-drive-wheels-limiting drive force is set low.

In still another preferred form of the invention, in the case that an amount by which the auxiliary-drive-wheel-limiting drive force increases is greater than an upper limit value, the second limiting unit causes the amount of increase to match the upper limit value, where a smaller upper limit value corresponds to a higher yaw rate of the vehicle.

The upper limit value is set to be lower in correspondence to a higher yaw rate of the vehicle. Therefore, when the yaw rate of a vehicle is high, the amount by which the auxiliarydrive-wheels-limiting drive force increases, i.e., the change in the auxiliary-drive-wheels-limiting drive force, is set low.

According to the first aspect of the invention, in the case that the amount by which the auxiliary-drive-wheel-limiting drive force increases is greater than an upper limit value, the second limiting unit causes the amount of increase to match the upper limit value, where a higher upper limit value corresponds to a higher total acceleration of the vehicle, and the total acceleration is a combination of longitudinal acceleration and lateral acceleration of the vehicle.

In the case that the total acceleration of the vehicle is high, the amount by which the auxiliary-drive-wheels-limiting drive force increases, i.e., the change in the auxiliary-drive-wheels-limiting drive force, may be set high. In this case, it is determined that the vehicle is traveling on, e.g., a high-friction road and the travel characteristics of the vehicle can be given priority.

According to the first aspect of the invention, the second control means may further have a detection unit for detecting whether the vehicle is in an unstable traveling state; and the second control means sends to the first control means the auxiliary drive wheel drive force as the auxiliary-drive-wheel-limiting drive force when an unstable traveling state has been detected by the detection unit.

The second control means can request auxiliary-drive-wheels-limiting drive force when it has been detected by the detection unit that the traveling state is unstable. At this time, the amount by which the auxiliary drive wheel drive force decreases becomes essentially zero, and the stability of the vehicle can be assured. After the stability of the vehicle has been assured, the second control means can request an auxiliary-drive-wheels-limiting drive force that is less than the auxiliary drive wheel drive force of when the traveling state has been detected by the detection unit to be unstable.

According to the invention, the second control means may further have a first detection unit for detecting whether the vehicle is in an unstable traveling state; and in the case that the detection result of the first detection unit changes from unstable to stable, the preparatory unit prepares a value that does not limit the auxiliary drive wheel drive force.

Generally, in the case that the traveling state is stable, the second control means is not required to request the auxiliary-drive-wheels-limiting drive force. In other words, when the state changes from unstable to stable, the second control means may request or output to the first control means a value that does not immediately limit the auxiliary drive wheel drive force. However, the preparatory unit prepares a value that does not limit the auxiliary drive wheel drive force and requests via the second limiting unit a value that does not limit the auxiliary-drive wheel drive force, whereby the change in the auxiliary-drive-wheels-limiting drive force is reduced.

In the case that the amount by which the auxiliary-drive-wheel-limiting drive force increases is greater than a first upper limit value, the second limiting unit causes the amount of increase to match the first upper limit value, where a lower first upper limit value corresponds to a higher yaw rate of the vehicle.

In the case that the yaw rate of the vehicle is high, the amount by which the auxiliary-drive-wheels-limiting drive force increases, in other words, the change in the auxiliary-drive-wheels-limiting drive force, can be set low.

In one preferred form of the invention, the second control means may further have a second detection unit for detecting whether a yaw rate sensor for detecting the yaw rate is inoperative; and in the case that the second detection unit has detected that the yaw rate sensor is inoperative and the amount by which the auxiliary-drive-wheel-limiting drive force increases is greater than a second upper limit value in lieu of the first upper limit value, the second limiting unit causes the amount of increase to match the second upper limit value, where a higher second upper limit value corresponds to a longer time elapsing from when the second detection unit has detected that the yaw raw sensor is inoperative.

Generally, in the case that the yaw rate sensor has failed, the second control means is not required to request auxiliary-drive-wheels-limiting drive force. In other words, when the yaw rate sensor has failed, the second control means may request or output to the first control means a value that does not immediately limit the auxiliary-drive-wheels-limiting drive force. However, the second control unit can continue to limit increase in the auxiliary-drive-wheels-limiting drive force by using the second upper limit value. Additionally, in the case that a large amount of time has elapsed from when the yaw rate sensor failed, the limiting of the second limiting unit is relaxed to allow the auxiliary-drive-wheels-limiting drive force to rapidly move toward a value that does not limit the auxiliary drive wheel drive force.

In the preferred form of the invention, a higher first upper limit value corresponds to a higher total acceleration of the vehicle, the total acceleration being a combination of longitudinal acceleration and lateral acceleration of the vehicle.

In the case that the total acceleration of vehicle is high, it is determined that the vehicle is traveling on a high-friction road, and priority can be given to the traveling characteristics of the vehicle.

According to the invention, the second control means may further have a detection unit for detecting whether a sensor is inoperative; and in the case the detection unit has detected that the sensor is inoperative, and the amount by which the auxiliary-drive-wheel-limiting drive force increases is greater than the upper limit value, the first limiting unit causes the amount of increase to match the upper limit value, where a higher upper limit value corresponds to a longer time elapsing from when the detection unit has detected that the sensor is inoperative.

In the case that a sensor has failed, the second control means limits increase in the auxiliary-drive-wheels-limiting drive force and can reduce change in the auxiliary-drive-wheels-limiting drive force. In other words, the second control means is capable of canceling a request for auxiliary-drive-wheels-limiting drive force in a delayed fashion rather than the request for auxiliary-drive-wheels-limiting drive force being canceled immediately.

The sensor may be a yaw rate sensor. In the case that the yaw rate sensor has failed, the second control means can cancel a request for auxiliary-drive-wheels-limiting drive force in a delayed fashion.

Alternatively, the sensor may be at least one of a yaw rate sensor, a longitudinal acceleration sensor, and a lateral acceleration sensor. In the case that the sensor is at least one of a yaw rate sensor, a longitudinal acceleration sensor, and a lateral acceleration sensor, the second control means can cancel a request for auxiliary-drive-wheels-limiting drive force in a delayed fashion.

According to the invention, the main drive wheel drive force may be the front-wheel drive force, and the auxiliary drive wheel drive force may be the rear-wheel drive force.

In the case that the traveling state of the vehicle is, e.g., oversteer and is therefore unstable, the rear-wheel drive force (auxiliary drive wheel drive force) is reduced, the front-wheel drive force (main drive wheel drive force) is increased, and oversteer can be reduced or eliminated.

According to the invention of the first aspect, the first control means may be drive force control means, and the second control means may be vehicle behavior control means.

Persons skilled in the art can readily understand that each of a plurality of embodiments in accordance with the present invention can be modified without departing from the spirit of the present invention.

BRIEF DESCRIPTION OF THE DRAWINGS

Certain preferred embodiments of the present invention will be described in detail below, by way of example only, with reference to the accompanying drawings, in which:

FIG. 3 is a block diagram showing a general configuration of a vehicle behavior control means of the control device according to the present invention;

FIGS. 4A and 4B are graphs showing examples of setting a reference drive force;

FIGS. 5A, 5B and 5C are graphs showing output examples of an output unit of the vehicle behavior control means;

FIG. 6 is a block diagram showing a modification according to the present invention;

DETAILED DESCRIPTION OF THE PREFERRED EMBODIMENTS

The embodiments described below are used for facilitating understanding of the present invention. Therefore, it is to be noted that the present invention is not unduly limited by the embodiments described below.

1. Vehicle

Figure 1:
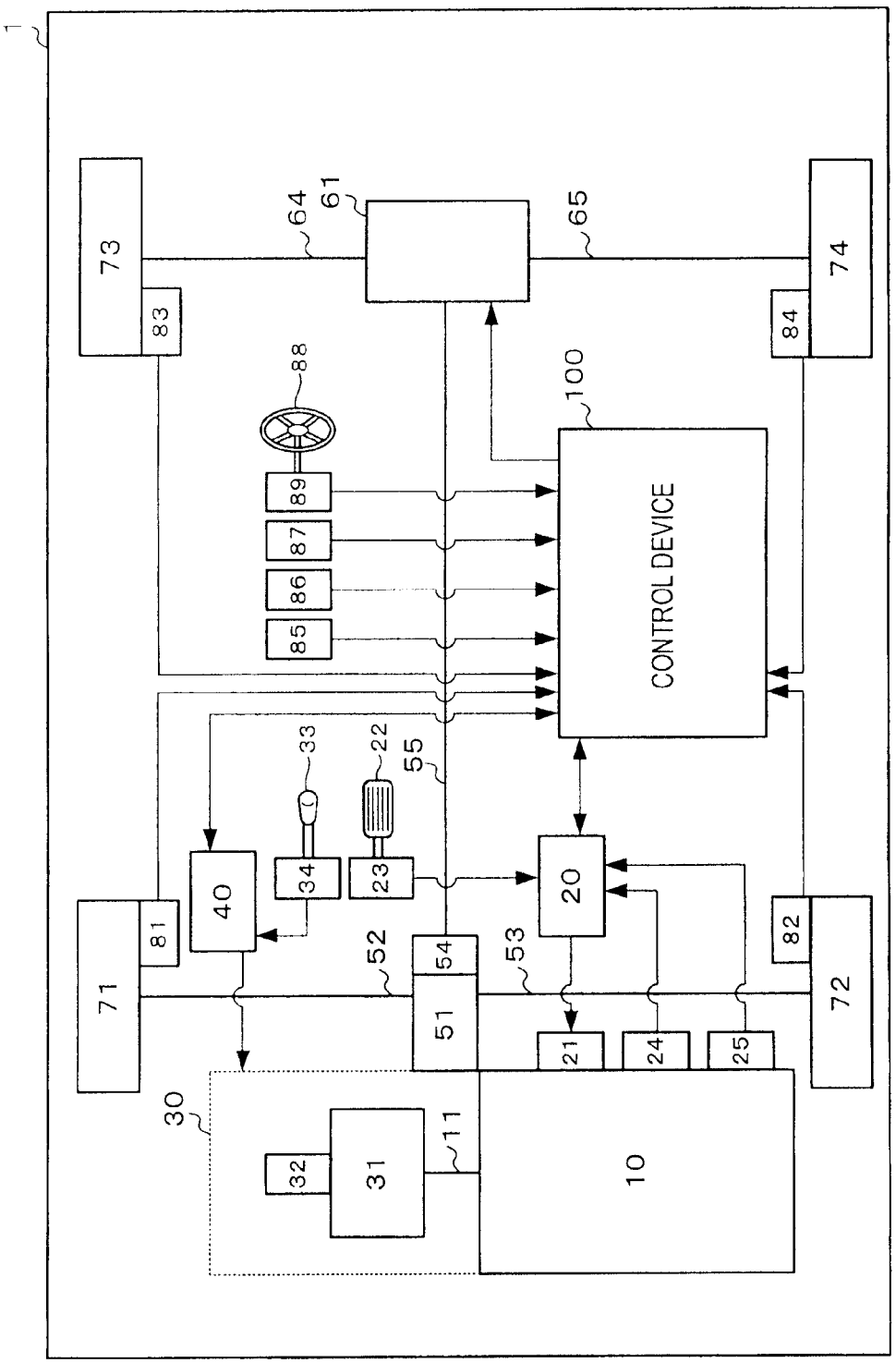
FIG. 1 is a block diagram showing a general configuration of a vehicle including a control device according to the present invention.

FIG. 1 shows a general configuration of a vehicle provided with a control device according to the present invention. As shown in FIG. 1, a vehicle 1 (e.g., an automobile) is provided with a control device 100 capable of executing various controls. The control device 100 is capable of controlling a front wheel drive force (a target value of the drive force transmitted to front wheels 71, 72) and a rear wheel drive force (a target value of the drive force transmitted to rear wheels 73, 74) of the vehicle 1 as examples of the various controls. Specific control of the control device 100 according to the present invention is described below in "2. Control Device."

In the embodiment shown in FIG. 1, the vehicle 1 is provided with a motor 10 (e.g., gasoline engine or another internal combustion engine). The motor 10 has an output shaft 11 and can cause the output shaft 11 to rotate. The vehicle 1 is provided with motor control means 20 (e.g., an engine ECU) for controlling the motor 10, and a throttle actuator 21. The motor control means 20 obtains a motor drive force (target value) and controls the throttle actuator 21 so that the rotation (the actual motor drive force) of the output shaft 11 of the motor 10 matches the motor drive force (target value).

The throttle (not shown) position or opening for controlling the amount of air-fuel mixture flowing into the motor 10 is controlled based on the motor drive force via the throttle actuator 21. In other words, the motor control means 20 obtains the throttle position that corresponds to the motor drive force, generates a control signal that corresponds to the throttle position, and sends the control signal to the throttle actuator 21. The throttle actuator 21 adjusts the throttle position in accordance with the control signal from the motor control means 20.

The vehicle 1 is provided with an accelerator pedal 22 and an accelerator sensor 23. The accelerator sensor 23 detects the amount of operation of the accelerator pedal 22 by the driver of the vehicle 1 and sends the amount of operation of the accelerator pedal 22 to the motor control means 20. The motor control means 20 generally obtains the throttle position or the motor drive force on the basis of the amount of operation of the accelerator pedal 22. The vehicle 1 is provided with a revolution sensor 24 and a pressure sensor 25. In the case that the motor 10 is, e.g., an engine, the revolution sensor 24 can detect the engine speed, and the pressure sensor 25 can detect the absolute pressure inside the intake tube that takes the air-fuel mixture into the engine. The motor control means 20 can obtain the throttle position or the motor drive force on the basis of the amount of operation of the accelerator pedal 22, and the detected absolute pressure and engine speed. The motor control means 20 can modify or change the amount of operation of the accelerator pedal 22 on the basis of a control signal (e.g., the traveling state of the vehicle 1) from the control device 100. Alternatively, the motor control means 20 may obtain the motor drive force and the throttle position on the basis of the amount of operation of the accelerator pedal 22, the detected engine speed, the detected absolute pressure, and a control signal from the control device 100.

In the embodiment shown in FIG. 1, the vehicle 1 is provided with a power transmission apparatus (power train, drive train). As shown in FIG. 1, the power transmission apparatus has, e.g., a transmission 30, a front differential gear mechanism 51, front drive shafts 52, 53, a transfer 54, a propeller shaft 55, a rear differential gear mechanism 61, rear drive shafts 64, 65. The transmission 30 has a torque converter 31 and a gear mechanism 32.

The power transmission apparatus is not limited to the example of FIG. 1, and it is also possible to modify, revise, or implement the example of FIG. 1. The power transmission apparatus may be, e.g., the drive force transmission system disclosed in FIG. 2 of Japanese Laid-open Patent Application (JP-A) No. 07-186758.

The rotation (the actual motor drive force) of the output shaft 11 of the motor 10 is converted to actual all-wheel drive force (the actual front-wheel drive force and the rear-wheel drive force) via the power transmission apparatus. In the control related to such conversion, the all-wheel drive force is determined based on the motor drive force (target value) of the motor control means 20, an amplification factor (a target value) of the torque converter 31, and a gear ratio (a target value) of the gear mechanism 32. The distribution from the front-wheel drive force (target value), which is the main drive wheel drive force, to the rear-wheel drive force (target value), which is the auxiliary drive wheel drive force, is determined based on the front-wheel drive force (target value) and the distribution ratio of the rear differential gear mechanism 61.

In the case that the distribution ratio of the rear differential gear mechanism 61 is, e.g., 100:0 in terms of the front-wheel drive force to rear-wheel drive force, the front-wheel drive force (target value), which is the main drive wheel drive force, matches the all-wheel drive force (target value). In the case that the distribution ratio of the rear differential gear mechanism 61 is, e.g., (100−x):x in terms of the front-wheel drive force to rear-wheel drive force, the front-wheel drive force (target value), which is the main drive wheel drive force, matches the value obtained by subtracting the rear-wheel drive force (target value), which is the auxiliary drive wheel drive force, from the all-wheel drive force (target value).

The front wheels 71, 72 are controlled by the front-wheel drive force (target value) via the front differential gear mechanism 51 and the front drive shafts 52, 53. The rear wheels 73, 74 are controlled by the rear-wheel drive force (target value) via the rear differential gear mechanism 61 and the rear drive shafts 64, 65. The actual all-wheel drive force is transmitted to the propeller shaft 55 via the transfer 54, and a portion of the actual all-wheel drive force transmitted to the propeller shaft 55 is distributed to the actual rear-wheel drive force transmitted to the rear differential gear mechanism 61. The remaining portion of the actual all-wheel drive force transmitted to the propeller shaft 55, transfer 54, and front differential gear mechanism 51 is the actual front-wheel drive force.

In the embodiment shown in FIG. 1, the vehicle 1 is provided with transmission control means 40 (e.g., an automatic transmission (AT) ECU) for controlling the gear ratio (e.g., the gear ratio of the gear mechanism 32) of the transmission 30. The vehicle 1 is provided with a shift lever 33 and a shift position sensor 34, and the transmission control means 40 generally determines the gear ratio of the gear mechanism 32 on the basis of the shift position (e.g., "1," "2," "D") of the shift lever 33 as detected by the shift position sensor 34.

In the case that the shift position of the shift lever 33 is, e.g., "1," the transmission control means 40 controls the gear mechanism 32 so that the gear mechanism 32 has a gear ratio that represents the first speed. In the case that the shift position of the shift lever 33 is, e.g., "D," the transmission control means 40 determines the gear ratio that represents any one among all of the gear ratios constituting the gear mechanism 32 composed of, e.g., first speed to fifth speed, on the basis of a control signal (e.g., the speed of the vehicle 1 and the all-wheel drive force (target value)) from the control device 100. In accordance therewith, the transmission control means 40 controls the gear mechanism 32 so that the gear mechanism 32 has a gear ratio that represents any one of, e.g., the first to fifth speeds. For example, when the transmission control means 40 thereafter changes from, e.g., the gear ratio that represents the first speed to the gear ratio that represents the second speed, the transmission control means 40 controls the gear mechanism 32 so that the gear mechanism 32 changes from the gear ratio that represents the first speed to the gear ratio that represents the second speed.

In the embodiment shown in FIG. 1, the vehicle 1 is provided with a wheel speed sensor 81 for detecting the rotational speed of the front wheel 71, and is also provided with a wheel speed sensor 82 for detecting the rotational speed of the front wheel 72. The vehicle 1 is provided with a wheel speed sensor 83 for detecting the rotational speed of the rear wheel 73, and is also provided with a wheel speed sensor 84 for detecting the rotational speed of the rear wheel 74. The control device 100 can obtain a speed of the vehicle 1 on the basis of the rotational speed (wheel speed) detected by the wheel speed sensors 81, 82, 83, 84. The vehicle 1 is provided with a longitudinal acceleration sensor 85 (e.g., longitudinal G sensor for detecting acceleration in units of gravitational acceleration) for detecting the acceleration of the vehicle 1 along a longitudinal or front-rear direction of the vehicle 1, and the control device 100 can correct the speed of the vehicle 1 using the longitudinal acceleration.

In the illustrated embodiment shown in FIG. 1, the vehicle 1 is provided with a yaw rate sensor 86 for detecting the yaw rate when the vehicle 1 turns. The vehicle 1 is also provided with a lateral acceleration sensor 87 (lateral G sensor for detecting the centrifugal acceleration in units of gravitational acceleration) for detecting the centrifugal force (centrifugal acceleration) of the vehicle 1 along the lateral direction of the vehicle 1. The vehicle 1 is provided with a steering wheel 88 and a steering angle sensor 89 for detecting a steering angle of the steering wheel 88.

The control device 100 can detect side slipping and other behavior of the vehicle 1 on the basis of the yaw rate, centrifugal acceleration (lateral acceleration), and steering angle. In addition to detecting such behavior, the control device 100 can carry out various controls (e.g., control related to at least one among the front wheels 71, 72 and the rear wheels 73, 74 via the brakes or other braking unit (not shown)), and all of the controls described above are not required to be carried out. Described below is a general overview of control of the control device 100.

2. Control Device

Figure 2:
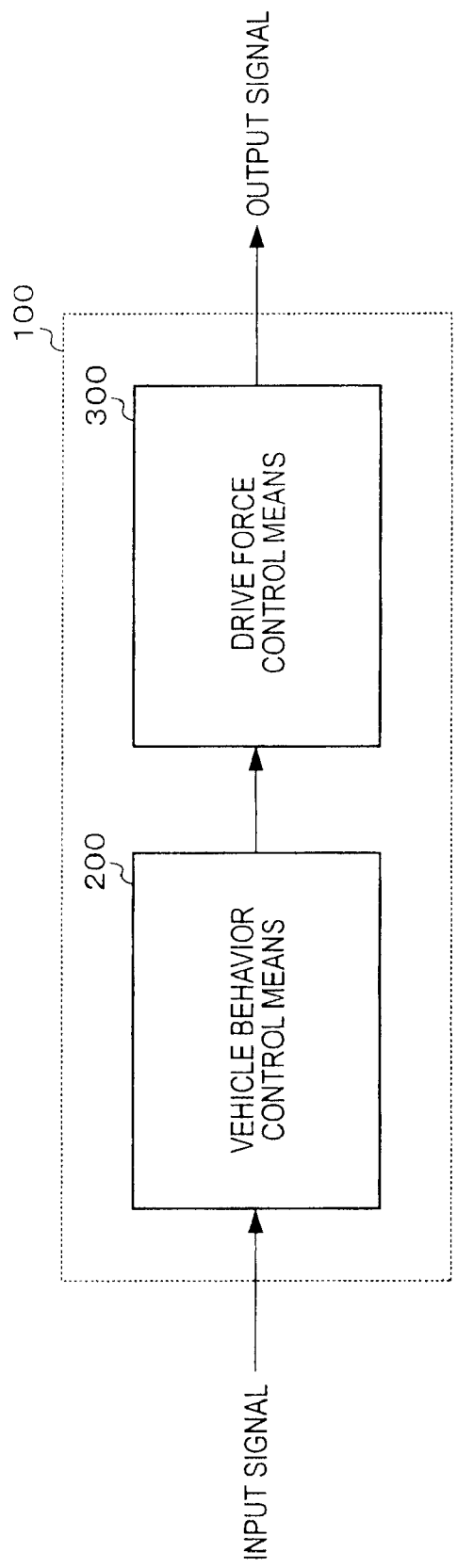
FIG. 2 is a block diagram showing a general configuration of the control device according to the present invention.

FIG. 2 shows in block diagram a general configuration of the control device 100 according to the present invention. As shown in FIG. 2, the control device 100 can accept input signals, generate output signals, and execute various controls. The control device 100 is provided with drive force control means or controller 300, and the drive force control means 300 controls the drive force of the main drive wheels (e.g., the front wheel drive force) and the drive force of the auxiliary drive wheels (e.g., rear wheel drive force), as an example of the various controls.

In the embodiment shown in FIG. 2, the control device 100 is also provided with vehicle behavior control means or controller 200. The vehicle behavior control means 200 is capable of calculating the auxiliary-drive-wheels-limiting drive force for limiting the drive force of the auxiliary drive wheels as an example of various controls. In the specific case that the traveling state of the vehicle is unstable, the vehicle behavior control means 200 limits the increase and decrease of auxiliary-drive-wheels-limiting drive force and is capable of sending to the drive force control means 300 the auxiliary-drive-wheels-limiting drive force limited in this manner.

Specifically, the drive force control means 300 determines the ratio between the main drive wheel drive force (target value) and the auxiliary drive wheel drive force (target value), for example, and determines, e.g., the auxiliary drive wheel drive force (target value) on the basis of the ratio and the all-wheel drive force (target value). The drive force control means 300 controls, e.g., the distribution ratio of the rear differential gear mechanism 61 of FIG. 1 using output signals so that the determined auxiliary drive wheel drive force (target value) is obtained. The output signal from the drive force control means 300 to the rear differential gear mechanism 61 is a control signal for controlling the auxiliary drive wheel drive force (target value).

When the auxiliary drive wheel drive force is zero due to the distribution ratio of the rear differential gear mechanism 61, in other words, when the propeller shaft 55 and the rear drive shafts 64, 65 are cut off from each other, the main drive wheel drive force (target value) or the front-wheel drive force matches the all-wheel drive force (target value) in the embodiment of FIG. 1. Alternatively, when the auxiliary drive wheel drive force is not zero due to the distribution ratio of the rear differential gear mechanism 61, in other words, when the propeller shaft 55 and the rear drive shafts 64, 65 are connected, the main drive wheel drive force (target value) matches the value obtained by subtracting the auxiliary drive wheel drive force (target value) from the all-wheel drive force (target value) in the embodiment of FIG. 1.

The vehicle behavior control means 200 of the control device 100 shown in FIG. 2 is capable of accepting input signals that express, e.g., yaw rate and the like acquired from the yaw rate sensor 86. The vehicle behavior control means 200 can calculate and request auxiliary-drive-wheels-limiting drive force on the basis of the input signals. Specifically, the input signals are signals for calculating the auxiliary-drive-wheels-limiting drive force, signals for detecting whether the traveling state of the vehicle 1 is unstable, and signals for other purposes. The input signals may be triggers that express timing for calculating and requesting the auxiliary-drive-wheels-limiting drive force.

The vehicle behavior control means 200 is capable of calculating the auxiliary-drive-wheels-limiting drive force in a plurality of modes. For example, in a first interval that corresponds to a first mode, the vehicle behavior control means 200 is capable of calculating the auxiliary-drive-wheels-limiting drive force so that the auxiliary-drive-wheels-limiting drive force decreases in accordance with a descending slope. The first mode may be referred to as, e.g., the initial mode, and the first interval is a predetermined interval (first predetermined interval) that starts, e.g., from when the traveling state of the vehicle 1 has been detected to be unstable. For example, in a second interval that corresponds to a second mode, the vehicle behavior control means 200 is capable of calculating the auxiliary-drive-wheels-limiting drive force so that the auxiliary-drive-wheels-limiting drive force increases in accordance with a rising slope. The second mode may be referred to as, e.g., the end mode or the gradual-return mode, and the second interval is a predetermined interval (second predetermined interval) that starts from when, e.g., the traveling state of the vehicle 1 has been detected to be unstable or, e.g., the yaw rate sensor 86 or another sensor has failed.

In the case that the vehicle behavior control means 200 makes a request for auxiliary-drive-wheels-limiting drive force (limiting drive force) to the drive force control means 300, the drive force control means 300 reduces the auxiliary drive wheel drive force (target value) and increases the main drive wheel drive force (target value). At this time, the drive force control means 300 matches the auxiliary drive wheel drive force (target value) to the auxiliary-drive-wheels-limiting drive force (limiting drive force) to reduce the auxiliary drive wheel drive force (target value). Specifically, the drive force control means 300 controls the rear differential gear mechanism 61 so that the auxiliary drive wheel drive force is reduced by the distribution ratio of the rear differential gear mechanism 61. When the propeller shaft 55 and the rear drive shafts 64, 65 are more weakly connected, the actual auxiliary drive wheel drive force is reduced, and as a result, the actual main drive wheel drive force is increased. Reduced auxiliary drive wheel drive force makes it possible to, e.g., reduce oversteer. Therefore, the stability of the vehicle 1 is improved, for example.

The drive force control means 300 is capable of determining in advance the main drive wheel drive force (target value) and the auxiliary drive wheel drive force (target value), reducing the auxiliary drive wheel drive force (target value) determined in advance in accordance with the a request from the vehicle behavior control means 200, and increasing the main drive wheel drive force (target value) determined in advance.

The drive force control means 300 may also be referred to as first control means or controller for determining the main drive wheel drive force (target value) and the auxiliary drive wheel drive force (target value), and the vehicle behavior control means 200 may be referred to as second control means or controller. The drive force control means 300 (first control means) primarily determines the main drive wheel drive force (target value) and the auxiliary drive wheel drive force (target value). The drive force control means 300 (first control means) may determine whether to respond to the request for limiting the auxiliary drive wheel drive force (target value) from the vehicle behavior control means 200 (second control means), and may deny the request for limitation. In the case that the vehicle behavior control means 200 sends to the drive force control means 300 the auxiliary-drive-wheels-limiting drive force (limiting drive force), the drive force control means 300 (first control means) can secondarily (ultimately) determine the main drive wheel drive force (target value) and the auxiliary drive wheel drive force (target value).

3. Vehicle Behavior Control Means

Second Control Means

FIG. 3 shows in block diagram a general configuration of the vehicle behavior control means 200 according to the present invention. The vehicle behavior control means 200 (second control means) is capable of requesting drive force control means (first control means), e.g., the drive force control means 300 shown in FIG. 2, to increase the auxiliary drive wheel drive force (target value). As shown in FIG. 3, the vehicle behavior control means 200 is provided with a preparatory unit 220, a first limiting unit 230, and a second limiting unit 240. The preparatory unit 220 prepares a reference drive force, and the first limiting unit 230 and the second limiting unit 240 limit decrease and increase, respectively, in the auxiliary-drive-wheels-limiting drive force. The preparatory unit 220, and the first limiting unit 230 and second limiting unit 240 may be referred to as computation units for computing the auxiliary-drive-wheels-limiting drive force. The vehicle behavior control means 200 may be provided with only such computation units, and may furthermore be provided with an output unit 250. The vehicle behavior control means 200 is optionally provided with a detection unit 210.

For example, the vehicle behavior control means 200 may be provided with a detection unit 210 for accepting the yaw rate as input from the yaw rate sensor 86 of FIG. 1, and the steer angle as input from the steering angle sensor 89, as shown in FIG. 3. The detection unit 210 may be referred to as an input unit, and in the case that the vehicle behavior control means 200 is not provided with such detection unit 210, the first limiting unit 230 or the second limiting unit 240, for example, may be referred to as an input unit for accepting the yaw rate and the like as input. The output unit 250 for requesting or outputting the auxiliary-drive-wheels-limiting drive force to, e.g., the drive force control means 300 of FIG. 2 may be referred to as a request unit. In the case that the vehicle behavior control means 200 is not provided with the output unit 250, the first limiting unit 230 or the second limiting unit 240 for requesting or outputting the auxiliary-drive-wheels-limiting drive force may be referred to as an output unit or a request unit.

3.1. Detection Unit

The detection unit 210 detects, e.g., an unstable state of the vehicle 1 and can instruct the preparatory unit 220 so that the preparatory unit 220 prepares a reference drive force, which is, e.g., the source of auxiliary-drive-wheels-limiting drive force. In the case that an unstable state has been detected, the detection unit 210 can send to the preparatory unit 220 a signal (e.g., a signal expressing a binary "1" or high level) expressing instruction or permission to prepare the reference drive force. The unstable state of the vehicle 1 can be judged by determining whether the traveling state of the vehicle 1 is unstable by using, e.g., the actual yaw rate acquired from the yaw rate sensor 86 and the scale yaw rate calculated based on steer angle and the speed of the vehicle 1. Specifically, an unstable state can be defined as when the difference between the actual yaw rate and the scale yaw rate (yaw rate deviation) is greater than a predetermined value. Also, an unstable state may be determined by subjecting the yaw rate deviation to filter processing. It is also possible to correct or adjust the scale yaw rate using the lateral acceleration acquired from the lateral acceleration sensor 87.

The determination of whether the vehicle 1 is in an unstable state is a determination of whether the traveling state of the vehicle 1 is unstable, and is more specifically a determination of whether the state is oversteer, and it is also possible to determine an unstable state (a judgment criterion of an oversteer state) from the difference between the actual yaw rate and the steer angle without consideration for the speed of the vehicle 1.

The detection unit 210 can accept input of the steer angle from, e.g., the steering angle sensor 89. Also, the detection unit 210 is capable of calculating the average of four rotational speeds (wheel speeds) detected by, e.g., the wheel speed sensors 81, 82, 83, 84 and obtain the average wheel speed Vaw_av of the drive wheels as the speed of the vehicle 1. Alternatively, the detection unit 210 calculates the average of two rotational speeds (wheel speeds) detected by, e.g., the wheel speed sensors 83, 84, and obtain or estimate the speed Vvh_es of the vehicle 1 as the speed of the vehicle 1.

The speed Vvh_es (estimated speed) of the vehicle 1 may include the application of an increasing limit and a decreasing limit to each of the wheel speeds of the rear wheels 73, 74 (auxiliary drive wheels) in order to eliminate the effect of noise caused by vibrations and the like of the vehicle 1, for example. In other words, the detection unit 210 is capable of correcting or adjusting the two rotational speeds (wheel speeds) detected by the wheel speed sensors 83, 84, calculating the average of the two rotational speeds (wheel speeds) thus corrected or adjusted, and obtaining or estimating the speed Vvh_es of the vehicle 1. The speed Vvh_es (estimated speed) of the vehicle 1 may be estimated using another method.

The detection unit 210 can send to the preparatory unit 220 a signal expressing whether the traveling state of the vehicle 1 is stable. The detection unit 210 may send the signal to, e.g., the output unit 250. The detection unit 210 is furthermore capable of sending a signal expressing, e.g., the yaw rate.

In the case that the traveling state of the vehicle 1 is unstable, the preparatory unit 220 prepares or calculates the reference drive force based on, e.g., the yaw rate deviation. The method for calculating the reference drive force is not limited to a method that uses yaw rate deviation. The preparatory unit 220 may prepare as the reference drive force a value that does not limit the auxiliary drive wheel drive force. The preparatory unit 220 may prepare or calculate the reference drive force in accordance with a plurality of modes. The detailed operation of the preparatory unit 220 is described later.

In the case that the traveling state of the vehicle 1 is unstable, the output unit 250 outputs the reference drive force prepared by the preparatory unit 220 to, e.g., the drive force control means 300 of FIG. 2 via the first limiting unit 230 and the second limiting unit 240. When it has been detected that the traveling state of the vehicle 1 is unstable, i.e., the instant the detection result of the detection unit 210 changes from stable to unstable, the output unit 250 accepts as input the auxiliary drive wheel drive force from, e.g., the drive force control means 300 of FIG. 2, and can output or return the auxiliary drive wheel drive force as the auxiliary-drive-wheels-limiting drive force. The detailed operation of the output unit 250 is described later.

The detection unit 210 is capable of detecting whether, e.g., the yaw rate sensor 86 has failed. Also, the detection unit 210 is capable of detecting whether sensors other than the yaw rate sensor 86 have failed. Specifically, the detection unit 210 can detect that a sensor has failed in the case that the signal from a sensor including the yaw rate sensor 86 has ceased. In the additional case that the signal from the yaw rate sensor 86 or another sensor shows an abnormal value, the detection unit 210 can detect that a sensor has failed. Additionally, the yaw rate sensor 86 and other sensors may send a signal indicate that the sensor itself has failed. The detection unit 210 is also capable of detecting that a sensor has failed in the case that the detection unit 210 has received a signal indicating that the sensor has failed. The detection unit 210 is capable of sending a signal (e.g., a signal expressing a binary "1" or high level) to the preparatory unit 220 indicating the fact that a sensor has failed.

For example, the detection unit 210 for detecting the unstable state of the vehicle 1 may be referred to as a first detection unit, and the detection unit 210 for detecting sensor inoperativeness may be referred to as a second detection unit. The first detection unit and the second detection unit may be mutually independent or may be integrally configured.

3.2. Preparatory Unit

The preparatory unit 220 shown in FIG. 3 prepares a reference drive force. The reference drive force is the source of output from the output unit 250. In the case that the output unit 250 or the vehicle behavior control means 200 outputs or requests, e.g., auxiliary-drive-wheels-limiting drive force to, e.g., the drive force control means 300 of FIG. 2, the auxiliary-drive-wheels-limiting drive force is based on the reference drive force. In the case that the output unit 250 or the vehicle behavior control means 200 does not output or request the auxiliary-drive-wheels-limiting drive force, the output (a value that does not limit the auxiliary drive wheel drive force) from the output unit 250 is also based on the reference drive force. Therefore, the preparatory unit 220 is capable of modifying or changing the reference drive force in accordance with, e.g., a signal from the detection unit 210, specifically, a signal that indicates whether the traveling state of the vehicle 1 is unstable.

FIGS. 4A and 4B show examples of setting the reference drive force. In the example shown in FIG. 4A, the solid line shows the reference drive force prepared by the preparatory unit 220. The signal from the detection unit 210 shows that the traveling state of the vehicle 1 is stable until time TS, and the preparatory unit 220 prepares as the reference drive force a value that does not limit the auxiliary drive wheel drive force. A value that does not limit the auxiliary drive wheel drive force is the maximum value of the auxiliary drive wheel drive force that can be determined by, e.g., the drive force control means 300. At time TS, the preparatory unit 220 prepares a reference drive force (first reference drive force) showing, e.g., a first value when the traveling state of the vehicle 1 is determined to be unstable by the detection unit 210. When it is detected by the detection unit 210 at time TE that the traveling state of the vehicle 1 is stable, the preparatory unit 220 prepares as a reference drive force a value that does not limit the auxiliary drive wheel drive force.

In the example of FIG. 4A, the dotted line shows the auxiliary drive wheel drive force secondarily (ultimately) determined by the drive force control means 300. The reference drive force prepared by the preparatory unit 220 is outputted from the output unit 250 via the first limiting unit 230 and the second limiting unit 240. Assuming the case in which the reference drive force prepared by the preparatory unit 220 is directly outputted from the output unit 250, the drive force control means 300 can cause the auxiliary drive wheel drive force to match the first reference drive force at time TS. When the auxiliary drive wheel drive force matches the first reference drive force, the auxiliary drive wheel drive force decreases but the main drive wheel drive force increases, whereby, e.g., understeer or another unstable traveling state is minimized or eliminated. However, the inventors found that in the case that the reference drive force varies directly downward, as shown in FIG. 4A, the auxiliary drive wheel drive force does not vary directly downward, whereby the stability of the vehicle 1 can be improved. In other words, the inventors found that it is preferable to provide a first limiting unit 230 for limiting reduction in the auxiliary drive wheel drive force from the output unit 250. The detailed operation of the first limiting unit 230 is described later.

Assuming the case that the reference drive force prepared by the preparatory unit 220 is directly outputted from the output unit 250, the drive force control means 300 can adopt the primarily determined auxiliary drive wheel drive force itself as the secondarily (ultimately) determined auxiliary drive wheel drive force when the traveling state of the vehicle 1 is detected by the detection unit 210 to be stable at time TE. Just prior to time TE, the drive force control means 300 can use the lowest drive force among the primarily determined auxiliary drive wheel drive force and the auxiliary drive wheel drive force (e.g., the first reference drive force) from the output unit 250 as the secondarily (ultimately) determined auxiliary drive wheel drive force. The secondarily (ultimately) determined auxiliary drive wheel drive force changes from the first reference drive force to the primarily determined auxiliary drive wheel drive force at time TE in the case that the auxiliary drive wheel drive force (e.g., the first reference drive force) from the output unit 250 is used as the secondarily (ultimately) determined auxiliary drive wheel drive force just prior to time TE. The present inventors found that such a state is preferably avoided. In other words, the present inventors found that it is preferable to provide a second limiting unit 240 for limiting increase in the auxiliary drive wheel drive force from the output unit 250. The detailed operation of the second limiting unit 240 is described later.

In the example of FIG. 4B, when the yaw rate sensor 86 or other sensor is detected by the detection unit 210 at time TF to have failed, the preparatory unit 220 prepares as the reference drive force a value that does not limit the auxiliary drive wheel drive force. In the case that a sensor has failed, the output unit 250 or the vehicle behavior control means 200 is capable of determining stoppage of the auxiliary-drive-wheels-limiting drive force. The inventors found that a second limiting unit 240 is preferably provided for limiting increase in the auxiliary drive wheel drive force from the output unit 250 at time TF rather than the reference drive force (a value that does not limit the auxiliary drive wheel drive force) prepared by the preparatory unit 220 being directly outputted from the output unit 250.

In an interval in which the traveling state of the vehicle 1 is unstable (e.g., from time TS to time TE, from time TS to time TF, and the like), the first value is not required to be a fixed value. Specifically, the preparatory unit 220 can receive, e.g., the yaw rate deviation from the preparatory unit 220, and the preparatory unit 220 can vary the first value so that the yaw rate deviation is reduced. In other words, in the interval in which the traveling state of the vehicle 1 is unstable, the preparatory unit 220 may prepare or calculate the reference drive force based on the yaw rate deviation.

3.3. First Limiting Unit

The first limiting unit 230 of FIG. 3 limits reduction in the output (e.g., the auxiliary-drive-wheels-limiting drive force) from the output unit 250. The first limiting unit 230 has, e.g., a lower limit value, and the lower limit value is set in, e.g., the first limiting unit 230, specifically, in a storage unit (e.g., memory, register, or the like) in the first limiting unit 230 (not shown). Specifically, the first limiting unit 230 receives the reference drive force prepared by the preparatory unit 220, and accepts the auxiliary-drive-wheels-limiting drive force already outputted from the output unit 250. The first limiting unit 230 compares the acquired reference drive force and the auxiliary drive wheel drive force, and limits reductions in the auxiliary-drive-wheels-limiting drive force (output from the first limiting unit 230) subsequently outputted from the output unit 250. Specifically, the first limiting unit 230 can determine whether the value (first provisional auxiliary-drive-wheels-limiting drive force (during decrease)) obtained by subtracting the lower limit value from the acquired auxiliary-drive-wheels-limiting drive force (previous value) is greater than the acquired reference drive force (second provisional auxiliary-drive-wheels-limiting drive force (during decrease)).

In the case that the determination result of the first limiting unit 230 is in the affirmative, let the reference drive force (second provisional auxiliary-drive-wheels-limiting drive force) be directly outputted from the output unit 250. In such a case, the difference between the auxiliary-drive-wheels-limiting drive force (current value) subsequently outputted from the output unit 250 and the auxiliary-drive-wheels-limiting drive force (previous value) already outputted from the output unit 250; i.e., the amount by which the auxiliary-drive-wheels-limiting drive force decreases, is equal to the lower limit value or less than the lower limit value. Therefore, the change in the auxiliary-drive-wheels-limiting drive force is considerable. In the case that the determination result of the first limiting unit 230 is affirmative, the first limiting unit 230 outputs a value (first provisional auxiliary-drive-wheels-limiting drive force) obtained by subtracting the lower limit value from the acquired auxiliary-drive-wheels-limiting drive force (previous value) in order to avoid a situation in which the change in auxiliary-drive-wheels-limiting drive force increases. The output unit 250 outputs the first provisional auxiliary-drive-wheels-limiting drive force as the auxiliary-drive-wheels-limiting drive force (current value) in place of the second provisional auxiliary-drive-wheels-limiting drive force.

In the case that the determination result of the first limiting unit 230 is negative, let the reference drive force (second provisional auxiliary-drive-wheels-limiting drive force) be directly outputted from the output unit 250. In such a case, the difference between the auxiliary-drive-wheels-limiting drive force (current value) subsequently outputted from the output unit 250 and the auxiliary-drive-wheels-limiting drive force (previous value) already outputted from the output unit 250, i.e., the amount by which the auxiliary-drive-wheels-limiting drive force decreases, is equal to the lower limit value or less than the lower limit value. Therefore, the change in the auxiliary-drive-wheels-limiting drive force is low. In the case that the determination result of the first limiting unit 230 is negative, the first limiting unit 230 outputs the acquired reference drive force (second provisional auxiliary-drive-wheels-limiting drive force). The output unit 250 outputs the second provisional auxiliary-drive-wheels-limiting drive force as the auxiliary-drive-wheels-limiting drive force (current value).

3.4. Second Limiting Unit

The second limiting unit 240 of FIG. 3 limits increase in the output (e.g., the auxiliary-drive-wheels-limiting drive force) from the output unit 250. The second limiting unit 240 has, e.g., an upper limit value, and the upper limit value is set in, e.g., the second limiting unit 240, specifically, in a storage unit (e.g., memory, register, or the like) in the second limiting unit 240 (not shown). Specifically, the second limiting unit 240 accepts the reference drive force prepared by the preparatory unit 220, and accepts the auxiliary-drive-wheels-limiting drive force already outputted from the output unit 250. The second limiting unit 240 compares the acquired reference drive force and the auxiliary drive wheel drive force and limits increase in the auxiliary-drive-wheels-limiting drive force (output from the second limiting unit 240) subsequently outputted from the output unit 250. Specifically, the second limiting unit 240 can determine whether the value (first provisional auxiliary-drive-wheels-limiting drive force (during increase)) obtained by subtracting the upper limit value from the acquired auxiliary-drive-wheels-limiting drive force (previous value) is less than the acquired reference drive force (second provisional auxiliary-drive-wheels-limiting drive force (during increase)).

In the case that the determination result of the second limiting unit 240 is affirmative, let the reference drive force (second provisional auxiliary-drive-wheels-limiting drive force) be directly outputted from the output unit 250. In this case, the difference between the auxiliary-drive-wheels-limiting drive force (current value) subsequently outputted from the output unit 250 and the auxiliary-drive-wheels-limiting drive force (previous value) already outputted from the output unit 250, i.e., the amount by which the auxiliary-drive-wheels-limiting drive force increases, is greater than the upper limit value. Therefore, the change in the auxiliary-drive-wheels-limiting drive force is considerable. In the case that the determination result of the second limiting unit 240 is affirmative, the second limiting unit 240 outputs a value (first provisional auxiliary-drive-wheels-limiting drive force) obtained by adding the upper limit value from the acquired auxiliary-drive-wheels-limiting drive force (previous value) in order to avoid a situation in which the change in auxiliary-drive-wheels-limiting drive force increases. The output unit 250 outputs the first provisional auxiliary-drive-wheels-limiting drive force as the auxiliary-drive-wheels-limiting drive force (current value) in lieu of the second provisional auxiliary-drive-wheels-limiting drive force.

In the case that the determination result of the second limiting unit 240 is negative, let the reference drive force (second provisional auxiliary-drive-wheels-limiting drive force) be directly outputted from the output unit 250. In this case, the difference between the auxiliary-drive-wheels-limiting drive force (current value) subsequently outputted from the output unit 250 and the auxiliary-drive-wheels-limiting drive force (previous value) already outputted from the output unit 250, i.e., the amount by which the auxiliary-drive-wheels-limiting drive force increases, is equal to the upper limit value or is less than the upper limit value. Therefore, the change in the auxiliary-drive-wheels-limiting drive force is low. In the case that the determination result of the second limiting unit 240 is negative, the second limiting unit 240 outputs the acquired reference drive force (second provisional auxiliary-drive-wheels-limiting drive force). The output unit 250 outputs the second provisional auxiliary-drive-wheels-limiting drive force as the auxiliary-drive-wheels-limiting drive force (current value).

The second limiting unit 240 limits increase from the output unit 250, and the first limiting unit 230 limits reduction of output from the output unit 250. In other words, in the case that the acquired reference drive force is greater than the acquired auxiliary-drive-wheels-limiting drive force (previous value), the second limiting unit 240 is valid, but the first limiting unit 230 is invalid. In the case that the acquired reference drive force is equal to the auxiliary-drive-wheels-limiting drive force (previous value) or is less than the acquired auxiliary-drive-wheels-limiting drive force (previous value), the second limiting unit 240 is invalid, but the first limiting unit 230 is valid. The valid second limiting unit 240 outputs the smallest auxiliary-drive-wheels-limiting drive force among the first provisional auxiliary-drive-wheels-limiting drive force (during increase) and the second provisional auxiliary-drive-wheels-limiting drive force (during increase). The valid first limiting unit 230 outputs the largest auxiliary-drive-wheels-limiting drive force among the first provisional auxiliary-drive-wheels-limiting drive force (during decrease) and the second provisional auxiliary-drive-wheels-limiting drive force (during decrease).

3.5. Output Unit

The output unit 250 of FIG. 3 outputs the output from the first limiting unit 230 and the output from the second limiting unit 240 as the auxiliary-drive-wheels-limiting drive force. The output unit 250 may or may not accept as input the signal indicating whether the traveling state of the vehicle 1 is unstable. In the case that the output unit 250 accepts this signal as input, the output unit 250 can acquire the auxiliary drive wheel drive force (e.g., the auxiliary drive wheel drive force secondarily (ultimately) determined by the drive force control means 300 of FIG. 2) when the traveling state of the vehicle 1 has been detected to be unstable by the detection unit 210. At this time, the output unit 250 can output or return the acquired auxiliary drive wheel drive force as the auxiliary-drive-wheels-limiting drive force to the drive force control means 300.

FIGS. 5A and 5B show output examples of the output unit. In the example shown in FIG. 5A, the solid line shows output from the output unit 250. The output unit 250 outputs a reference drive force prepared by the preparatory unit 220 via the first limiting unit 230 and the second limiting unit 240. In the example 5A, the signal from the detection unit 210 indicates that the traveling state of the vehicle 1 is stable until time TS, and the output unit 250 outputs a reference drive force (a value that does not limit the auxiliary drive wheel drive force) prepared by the preparatory unit 220 as shown in FIG. 4A, for example.

When it has been detected by the detection unit 210 at time TS that the traveling state of the vehicle 1 is unstable, the preparatory unit 220 prepares a reference drive force (first reference drive force) that indicates, e.g., a first value. Therefore, the output unit 250 limits the first reference drive force using the first limiting unit 230, and the output (auxiliary-drive-wheels-limiting drive force) from the output unit 250 decreases in accordance with the downward slope from the value that does not limit the auxiliary drive wheel drive force to the first reference drive force. In the example of FIG. 5A, the dotted line indicates the auxiliary drive wheel drive force secondarily (ultimately) determined by the drive force control means 300. In the case that the output (auxiliary-drive-wheels-limiting drive force) from the output unit 250 immediately after time TS is greater than the auxiliary drive wheel drive force primarily determined by the drive force control means 300, the drive force control means 300 can use the secondarily (ultimately) determined auxiliary drive wheel drive force (the dotted line from the time TS to the time TA) as shown in FIG. 5A. From time TA to time TB, the drive force control means 300 is capable of causing the secondarily (ultimately) determined auxiliary drive wheel drive force to match the auxiliary-drive-wheels-limiting drive force (output from the output unit 250). In the example of FIG. 5A, the solid line that corresponds from time TA to time TB is drawn as a bold line and is a solid line in which the output (solid line) from the output unit 250 matches the auxiliary drive wheel drive force (dotted line) ultimately determined by the drive force control means 300.

In the examples of FIGS. 5B and 5C, the solid line shows the output from the output unit 250 which accepts as input a signal that indicates whether the traveling state of the vehicle 1 is unstable. When it has been detected by the detection unit 210 at time TS that the traveling state of the vehicle 1 is unstable, the output unit 250 acquires the auxiliary drive wheel drive force secondarily (ultimately) determined by the drive force control means 300 and outputs the acquired auxiliary drive wheel drive force as the auxiliary-drive-wheels-limiting drive force. Therefore, the output (auxiliary-drive-wheels-limiting drive force) from the output unit 250 decreases at time TS in accordance with the downward slope from the auxiliary drive wheel drive force to the first reference drive force. In the case that the output (auxiliary-drive-wheels-limiting drive force) from the output unit 250 immediately after time TS is less than the auxiliary drive wheel drive force primarily determined by the drive force control means 300, the drive force control means 300 can use the auxiliary-drive-wheels-limiting drive force that decreases in accordance with the downward slope. In this case, the auxiliary drive wheel drive force can be effectively limited by the auxiliary-drive-wheels-limiting drive force. In the example of FIG. 5B, the secondarily (ultimately) determined auxiliary drive wheel drive force matches the auxiliary-drive-wheels-limiting drive force (output from the output unit 250) from time TS to time TC, which is drawn with a bold solid line. In the example of FIG. 5C, the secondarily (ultimately) determined auxiliary drive wheel drive force matches the auxiliary-drive-wheels-limiting drive force (output from the output unit 250 from time TS to time TD, which is drawn with a bold solid line.

In the example of FIG. 5A and the example of FIG. 5B, the preparatory unit 220 prepares a value that does not limit the auxiliary drive wheel drive force as the reference drive force when the traveling state of the vehicle 1 is detected by the detection unit 210 to be stable at time TE. In the example of FIG. 5C, the preparatory unit 220 prepares a value that does not limit the auxiliary drive wheel drive force as the reference drive force when it has been detected by the detection unit 210 at time TF that the yaw rate sensor 86 or another sensor has failed. Therefore, the output unit 250 limits the value that does not limit the auxiliary drive wheel drive force using the second limiting unit 240, and the output (auxiliary-drive-wheels-limiting drive force) from the output unit 250 increases in accordance with the upward slope from the first reference drive force to the value that does not limit the auxiliary drive wheel drive force. At this time, in the example of FIG. 5A, the secondarily (ultimately) determined auxiliary drive wheel drive force matches the auxiliary-drive-wheels-limiting drive force (output from the output unit 250) from time TE to, e.g., time TB. In the example of FIG. 5B, the secondarily (ultimately) determined auxiliary drive wheel drive force matches the auxiliary-drive-wheels-limiting drive force (output from the output unit 250) from time TE to, e.g., time TC. In the example of FIG. 5C, the secondarily (ultimately) determined auxiliary drive wheel drive force matches the auxiliary-drive-wheels-limiting drive force (output from the output unit 250) from time TF to, e.g., time TD.

In the interval (e.g., from time TS to time TE, from time TS to time TF, and the like) in which the traveling state of the vehicle 1 is unstable, the first value (first reference drive force) is not required to be a fixed value. Specifically, the preparatory unit 220 may prepare or calculate a reference drive force based on the yaw rate deviation. In the interval in which the traveling state of the vehicle 1 is unstable, the output unit 250 can limit the varying reference drive force using the first limiting unit 230 and the second limiting unit 240 when the reference drive force varies. Even if the amount of increase in the reference drive force, and, consequently, the amount by which the auxiliary-drive-wheels-limiting drive force increases, are high in the interval in which the traveling state of the vehicle 1 is unstable, the increasing reference drive force or auxiliary-drive-wheels-limiting drive force is limited in accordance with the upward slope based on the upper limit value. Even if the amount of decrease in the reference drive force, and, consequently, the amount by which the auxiliary-drive-wheels-limiting drive force decreases, are high in the interval in which the traveling state of the vehicle 1 is unstable, the decreasing reference drive force or auxiliary-drive-wheels-limiting drive force is limited in accordance with the downward slope based on the lower limit value.

4. Modified Example

The first limiting unit 230 of FIG. 3 causes the decrease amount to match the lower limit value in the case that the amount by which the auxiliary-drive-wheels-limiting drive force decreases is greater than the lower limit value. In other words, the output from the output unit 250 matches the downward slope based on the lower limit value as shown in FIG. 5B, for example. At this time, the lower limit value is not required to be a fixed value. Specifically, the lower limit value can be set lower in correspondence with a higher speed of the vehicle 1. The lower limit value can be set lower in correspondence with a higher lateral acceleration of the vehicle 1. The change in the auxiliary-drive-wheels-limiting drive force is furthermore reduced by reducing the downward slope, and the occurrence of understeer after oversteer has been eliminated can be reduced, for example. Also, vehicle 1 vibrations can be reduced. In this manner, the stability of the vehicle 1 is improved by correcting or adjusting the lower limit value. A modified example or additional configuration example of the first limiting unit 230 will be described below.

The second limiting unit 240 of FIG. 3 causes the increase amount to match the upper limit value in the case that the amount by which the auxiliary-drive-wheels-limiting drive force increases is greater than the upper limit value. In other words, the output of the output unit 250 matches the upward slope based on the upper limit value, as shown in FIG. 5B, for example. At this time, the upper limit value is not required to be a fixed value. Specifically, the upper limit value can be set low in correspondence to a higher yaw rate of the vehicle 1. The upper limit value can be set higher in correspondence to a higher total acceleration (combined acceleration of the longitudinal acceleration and the lateral acceleration) of the vehicle 1. Change in the auxiliary-drive-wheels-limiting drive force is further reduced by reducing the upward slope, and, e.g., and the reoccurrence of oversteer after oversteer has been eliminated can be reduced, for example. Also, limiting the acceleration of the vehicle 1 can be relaxed by increasing the upward slope. In this manner, the stability of the vehicle 1 is improved or the travel characteristics of the vehicle 1 can be given priority by correcting or adjusting the upper limit value. A modified example or additional configuration example of the second limiting unit 240 will be described below.

FIG. 6 shows a modification of the present invention. As shown in FIG. 6, a first setting unit 260 accepts the speed of the vehicle 1 as input from the detection unit 210 of FIG. 3, for example. Also, the first setting unit 260 accepts the lateral acceleration as input from the lateral acceleration sensor 87 of FIG. 1, for example. The first setting unit 260 may set the lower limit value set in the first limiting unit 230 on the basis of at least one of the speed and lateral acceleration of the vehicle 1. The second setting unit 270 accepts the lateral acceleration as input. The second setting unit 270 accepts the longitudinal acceleration of the vehicle 1 as input from the sensor 85 of FIG. 1, for example. Furthermore, the second setting unit 270 accepts the yaw rate as input from the detection unit 210 of FIG. 3, for example. The second setting unit 270 may set the upper limit value set in the second limiting unit 240 on the basis of only the yaw rate.

Figure 7:
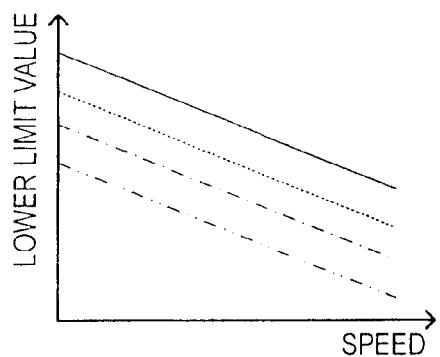
FIG. 7 shows a control map used for setting the lower limit value.

FIG. 7 shows an example of a control map used for setting the lower limit value. In the example of FIG. 7, the solid line shows the speed dependency of when the first lateral acceleration is shown. The dotted line shows the speed dependency of when the second lateral acceleration is shown. The dot-dash line shows the speed dependency of when a third lateral acceleration that is greater than the second lateral acceleration is shown. The two-dot-dash line shows the speed dependency of when a fourth lateral acceleration that is greater than the third lateral acceleration is shown. For example, the first setting unit 260 of FIG. 6 sets the lower limit value set in the first limiting unit 230 on the basis of the speed and lateral acceleration of the vehicle 1, as shown in FIG. 7. In the example of FIG. 7, the lower limit value is lower in correspondence with a higher speed, but the relationship between the lower limit value and the speed is not limited to the example of FIG. 7. For example, the relationship between the lower limit value and the speed may also be a line chart. The relationship between the lower limit value and the speed may be a curve expressed by a quadratic function, a higher-degree polynomial function, or the like rather than a linear function; and may be a stepped linear relationship expressed by a step function. Similarly, the relationship between the lower limit value, the speed, and the lateral acceleration is not limited to the example of FIG. 7.

Figure 8:
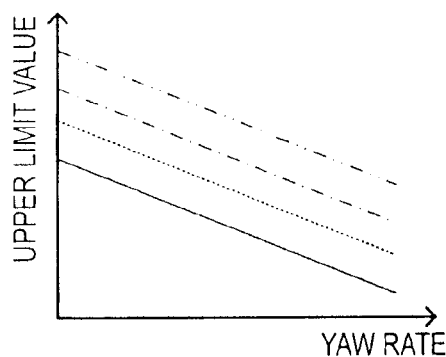
FIG. 8 shows a control map used for setting the upper limit value.

FIG. 8 shows an example of a control map used for setting the upper limit value. In the example of FIG. 8, the solid line shows the yaw rate dependency of when the first total acceleration is shown. The dotted line shows the yaw rate dependency of when a second total acceleration which is greater than the first total acceleration is shown. The dot-dash line shows the yaw rate dependency of when a third total acceleration that is greater than the second total acceleration is shown. The two-dot-dash line shows the yaw rate dependency of when a fourth total acceleration that is greater than the third total acceleration is shown. As previously described, the total acceleration includes longitudinal acceleration and lateral acceleration. For example, the second setting unit 270 of FIG. 6 sets the upper limit value set in the second limiting unit 240 on the basis of yaw rate and total acceleration of the vehicle 1, as shown in FIG. 8. In the example of FIG. 8, the upper limit value is lower in correspondence to a higher yaw rate, but the relationship between the upper limit value and the yaw rate is not limited to the example of FIG. 8. For example, the relationship between the upper limit value and the yaw rate may be a line chart. The relationship between the upper limit value and the yaw rate may be a curve expressed by a quadratic function, a higher-degree polynomial function, or the like rather than a linear function; and may be a stepped linear relationship expressed by a step function. Similarly, the relationship between the upper limit value, the yaw rate, and the total acceleration is not limited to the example of FIG. 8.

The second setting unit 270 of FIG. 6 ordinarily sets the upper limit value (first upper limit value) that is set in the second limiting unit 240, and in the case that at least one among, e.g., the yaw rate sensor 86, the lateral acceleration sensor 87, and the longitudinal acceleration sensor 85 fails, the second setting unit 270 can set another upper limit value (second upper limit value). A failure of the yaw rate sensor 86 to operate may be detected by, e.g., the detection unit 210 of FIG. 3 (first detection unit), or may be detected by the second setting unit 270 (second detection unit) of FIG. 6.

Figure 9:
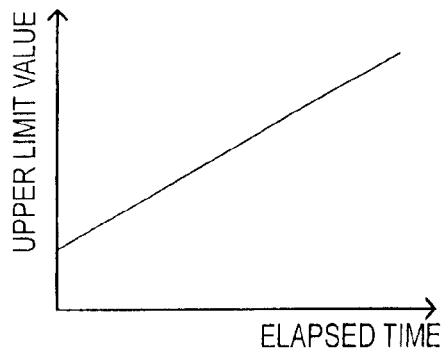
FIG. 9 shows a control map used for setting the upper limit value when the sensor has failed.

FIG. 9 shows an example of a control map used for setting another upper limit value (second upper limit value). The upper limit value when the yaw rate sensor 86 or another sensor has failed is set to be higher in correspondence with an increased elapsed time from the time at which the sensor was detected to have failed, as shown in FIG. 9. In the example of FIG. 9, the upper limit value is higher in correspondence to increased elapsed time, but the relationship between the upper limit value and the elapsed time is not limited to the example of FIG. 9. For example, the relationship between the upper limit value and the elapsed time may also be a line chart. The relationship between the upper limit value and the elapsed time may be a curve expressed by a quadratic function, a higher-degree polynomial function, or the like rather than a linear function; and may be a stepped linear relationship expressed by a step function.

Obviously, various minor changes and modifications of the present invention are possible in light of the above teaching. It is therefore to be understood that within the scope of the appended claims the invention may be practiced otherwise than as specifically described.

What is claimed is:

1. A control device for controlling a front wheel drive force and a rear wheel drive force of a vehicle, the control device comprising:

first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; and second control means for sending to the first control means an auxiliary-drive-wheel-limiting drive force for limiting the drive force of the auxiliary drive wheel, wherein the second control means has:

a preparatory unit for preparing a reference drive force;
a first limiting unit for limiting a reduction in the auxiliary-drive-wheel-limiting drive force; and
a second limiting unit for limiting an increase in the auxiliary-drive-wheel-limiting drive force, wherein the second control means sends to the first control means the reference drive force as the auxiliary-drive-wheel-limiting drive force via the first limiting unit and the second limiting unit.

2. The control device according to claim 1, wherein the first control means increases the drive force of the main drive wheel by causing the drive force of the auxiliary drive wheel to match the auxiliary-drive-wheel-limiting drive force from the second control means.

3. The control device according to claim 1, wherein in the case that the amount by which the auxiliary-drive-wheel-limiting drive force decreases is greater than a lower limit value, the first limiting unit causes the amount of decrease to match the lower limit value, where the lower limit value is adjusted in correspondence with a vehicle speed, such that as vehicle speed increases, the lower limit value decreases.

4. The control device according to claim 1, wherein in the case that the amount by which the auxiliary-drive-wheel-limiting drive force decreases is greater than a lower limit value, the first limiting unit causes the amount of decrease to match the lower limit value, where the lower limit value is adjusted in correspondence with lateral acceleration of the vehicle, such that as lateral acceleration increases, the lower limit value decreases.

5. The control device according to claim 1, wherein in the case that the amount by which the auxiliary-drive-wheel-limiting drive force increases is greater than an upper limit value, the second limiting unit causes the amount of increase to match the upper limit value, where the upper limit value is adjusted in correspondence with a yaw rate of the vehicle, such that as yaw rate increases, the upper limit value decreases.

6. The control device according to claim 1, wherein in the case that the amount by which the auxiliary-drive-wheel-limiting drive force increases is greater than an upper limit value, the second limiting unit causes the amount of increase to match the upper limit value, where the upper limit value is adjusted in correspondence with a total acceleration of the vehicle, such that as total acceleration increases, the upper limit value decreases, and wherein the total acceleration is a combination of longitudinal acceleration and lateral acceleration of the vehicle.

7. The control device according to claim 1, wherein:
the second control means further has a detection unit for detecting whether the vehicle is in an unstable traveling state; and
the second control means sends to the first control means the auxiliary drive wheel drive force as the auxiliary-drive-wheel-limiting drive force when an unstable traveling state has been detected by the detection unit.

8. The control device according to claim 1, wherein:
the second control means further has a first detection unit for detecting whether the vehicle is in an unstable traveling state; and
in the case that a detection result of the first detection unit changes from unstable to stable, the preparatory unit prepares a value that does not limit the auxiliary drive wheel drive force.

9. The control device according to claim 8, wherein in the case that an amount by which the auxiliary-drive-wheel-limiting drive force increases is greater than a first upper limit value, the second limiting unit causes the amount of increase to match the first upper limit value, where the first upper limit value is adjusted in correspondence with a yaw rate of the vehicle, such that as yaw rate increases, the first upper limit value decreases.

10. The control device according to claim 9, wherein:
the first upper limit value is adjusted in correspondence with a total acceleration of the vehicle, such that as total acceleration increases, the first upper limit value increases, and wherein the total acceleration being a combination of the longitudinal acceleration and lateral acceleration of the vehicle.

11. The control device according to claim 1, wherein
the second control means further has a detection unit for detecting whether a sensor is inoperative; and
in the case the detection unit has detected that the sensor is inoperative, and an amount by which the auxiliary-drive-wheel-limiting drive force increases is greater than an upper limit value, the first limiting unit causes the amount of increase to match the upper limit value, where the upper limit value is adjusted in correspondence with time elapsing from when the detection unit has detected that the sensor is inoperative, such that as more time elapses, the upper limit value decreases.

12. The control device according to claim 11, wherein the sensor is a yaw rate sensor.

13. The control device according to claim 11, wherein the sensor is at least one of a yaw rate sensor, a longitudinal acceleration sensor, and a lateral acceleration sensor.

14. The control device according to claim 1, wherein the main drive wheel drive force is the front-wheel drive force, and the auxiliary drive wheel drive force is the rear-wheel drive force.

15. The control device according to claim 1, wherein the first control means is a drive force control means, and the second control means is a vehicle behavior control means.

16. A control device for controlling a front wheel drive force and a rear wheel drive force of a vehicle, the control device comprising:
first control means for controlling a drive force of a main drive wheel and a drive force of an auxiliary drive wheel, the drive force of the main drive wheel being one of the front-wheel drive force and the rear-wheel drive force, and the drive force of the auxiliary drive wheel being another of the front-wheel drive force and the rear-wheel drive force; and
second control means for sending to the first control means an auxiliary-drive-wheel-limiting drive force for limiting the drive force of the auxiliary drive wheel, wherein the second control means has:
a preparatory unit for preparing a reference drive force;
a first limiting unit for limiting a reduction in the auxiliary-drive-wheel-limiting drive force; and
a second limiting unit for limiting an increase in the auxiliary-drive-wheel-limiting drive force, wherein:
the second control means sends to the first control means the reference drive force as the auxiliary-drive-wheel-limiting drive force via the first limiting unit and the second limiting unit;
the second control means further has a first detection unit for detecting whether the vehicle is in an unstable traveling state; and
in the case that a detection result of the first detection unit changes from unstable to stable, the preparatory unit prepares a value that does not limit the auxiliary drive wheel drive force;
wherein in the case that an amount by which the auxiliary-drive-wheel-limiting drive force increases is greater than a first upper limit value, the second limiting unit causes the amount of increase to match the first upper limit value, where a lower first upper limit value corresponds to a higher yaw rate of the vehicle;

the second control means further has a second detection unit for detecting whether a yaw rate sensor for detecting the yaw rate is inoperative; and in the case that the second detection unit has detected that the yaw rate sensor is inoperative and the amount by which the auxiliary-drive-wheel-limiting drive force increases is greater than a second upper limit value in lieu of the first upper limit value, the second limiting unit causes the amount of increase to match the second upper limit value, where a higher second upper limit value corresponds to a longer time elapsing from when the second detection unit has detected that the yaw rate sensor is inoperative.

* * * * *